US012097585B2

(12) United States Patent
Eto et al.

(10) Patent No.: US 12,097,585 B2
(45) Date of Patent: Sep. 24, 2024

(54) PROCESSING DEVICE AND PROCESSING METHOD

(71) Applicant: MITSUBISHI HEAVY INDUSTRIES, LTD., Tokyo (JP)

(72) Inventors: Jun Eto, Tokyo (JP); Hirokazu Unno, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 436 days.

(21) Appl. No.: 16/624,100

(22) PCT Filed: Nov. 9, 2017

(86) PCT No.: PCT/JP2017/040446
§ 371 (c)(1),
(2) Date: Dec. 18, 2019

(87) PCT Pub. No.: WO2019/092832
PCT Pub. Date: May 16, 2019

(65) Prior Publication Data
US 2020/0206854 A1  Jul. 2, 2020

(51) Int. Cl.
*B23Q 3/06* (2006.01)
*B23C 3/13* (2006.01)
*B23Q 17/20* (2006.01)

(52) U.S. Cl.
CPC ............. *B23Q 3/062* (2013.01); *B23Q 3/061* (2013.01); *B23C 3/13* (2013.01); *B23Q 3/066* (2013.01); *B23Q 17/20* (2013.01); *B23Q 2703/02* (2013.01)

(58) Field of Classification Search
CPC ........ B23Q 3/062; B23Q 3/061; B23Q 3/066; B23Q 17/20; B23Q 2703/02; B23C 3/13
See application file for complete search history.

(56) References Cited

U.S. PATENT DOCUMENTS 7,346,969 B2 * 3/2008 Huang .................... B23P 13/02
269/57
10,391,595 B2 * 8/2019 Hung ................... B23Q 16/024
(Continued)

FOREIGN PATENT DOCUMENTS

CN 101412120 A * 4/2009
CN 101412120 B * 6/2010
(Continued)

OTHER PUBLICATIONS

Machine Translation of CN10141210A by Gong. "Numerical control machining method based on rigid construction parts and clamping fixture for numerical control machining". (Year: 2009).*
(Continued)

*Primary Examiner* — Nirvana Deonauth
(74) *Attorney, Agent, or Firm* — Wenderoth, Lind & Ponack, L.L.P.

(57) ABSTRACT

This processing device is provided with: a tool for machining a workpiece W along the thickness direction thereof, the width-direction external shape of the workpiece W being substantially finished; and a flexible vice 7 that clamps the workpiece W in the width direction without clamping the workpiece W in the thickness direction. The flexible vice 7 is provided with a position adjustment mechanism that prevents the position of the workpiece W from changing in a plane along the width direction before and after the workpiece W is clamped. The present invention is provided with a rough processing tool for performing processing at a rough-processing position, a finishing processing tool for performing processing at a finishing-processing position, and a control unit that causes the position adjustment mechanism to move between the processing performed by the rough processing tool and the processing performed by the finishing processing tool.

4 Claims, 6 Drawing Sheets

(56) References Cited

U.S. PATENT DOCUMENTS

| | | | | |
|---|---|---|---|---|
| 10,792,774 B2* | 10/2020 | Shillabeer | ............... | B25B 1/103 |
| 2016/0144472 A1* | 5/2016 | Merilainen | ............ | B23Q 3/066 |
| | | | | 29/559 |

FOREIGN PATENT DOCUMENTS

| | | |
|---|---|---|
| CN | 104400500 | 3/2015 |
| JP | 02-053328 | 4/1990 |
| JP | 05-031840 | 4/1993 |
| JP | 6-310153 | 11/1994 |
| JP | 2000-000741 | 1/2000 |
| JP | 2003-127042 | 5/2003 |
| JP | 2005-161455 | 6/2005 |
| JP | 3785717 | 6/2006 |
| WO | 2014/191629 | 12/2014 |

OTHER PUBLICATIONS

Machine Translation of CN-101412120-B "Numerical Control Machining Method Based on Rigid Construction Parts and Claimping Fixture for Numerical Control Machining" by Bin Gong, Wendong Zhou, Jumbin Wang and Xiaowei Zheng. (Year: 2010).*
International Search Report issued Feb. 13, 2018 in International (PCT) Patent Application No. PCT/JP2017/040446, with English Translation.
Written Opinion of the International Searching Authority issued Feb. 13, 2018 in International (PCT) Patent Application No. PCT/JP2017/040446, with English Translation.
Extended European Search Report issued Oct. 6, 2020 in corresponding European Application No. 17931793.8.

* cited by examiner

PROCESSING DEVICE AND PROCESSING METHOD

TECHNICAL FIELD

The present invention relates to a processing device and a processing method for processing an easily deformable workpiece, for example, such as a large component of an aircraft.

BACKGROUND ART

In general, as accuracy of machine-processed components, it is necessary to consider not only processing accuracy on a processing machine, but also accuracy in a free state where a clamp is removed after processing. In particular, it is important for components such as elongated and low rigid aircraft frames to maintain accuracy during assembly. In recent years, assembly based on product accuracy is widely introduced from assembly based on a jig. Accordingly, it becomes more important to consider component accuracy in the free state.

Here, configuration elements of the component accuracy include processing accuracy and processing distortion. The processing accuracy means accuracy required in a state where the components are clamped on the machine. The processing accuracy is mainly affected by accuracy of the processing machine, an error between steps, vibration or deformation caused by a processing load, and a temperature change. The processing distortion means accuracy required after the components are unclamped. The processing distortion is mainly affected by released residual stress of a raw material, work hardening, and clamping.

PTL 1 discloses a clamping device that minimizes deformation during clamping by supporting a thin plate-shaped workpiece from a rear surface.

CITATION LIST

Patent Literature

[PTL 1] Japanese Patent No. 3785717

SUMMARY OF INVENTION

Technical Problem

However, according to PTL 1 described above, although the workpiece is a thin plate, deformation in a thickness direction is not taken into consideration. Consequently, the workpiece is corrected in the thickness direction when the workpiece is clamped. If the workpiece is unclamped after the processing, distortion remains in the workpiece.

In this way, clamping during the processing is mainly performed in order to fix and support the workpiece. Accordingly, the accuracy after the workpiece is unclamped is not taken into consideration. In particular, the elongated component has low rigidity. Therefore, the elongated component is significantly affected by the processing distortion.

The present disclosure aims to provide the processing device and the processing method capable of minimizing the processing distortion as much as possible.

Solution to Problem

According to an aspect of the present invention, there is provided a processing device including a tool for machining a workpiece in a thickness direction, the workpiece having a substantially finished external shape in a width direction, and a clamping fixture for clamping the workpiece in the width direction without clamping the workpiece in the thickness direction.

The workpiece is machined in the thickness direction by using a tool such as an end mill. The external shape of the workpiece in the width direction is a substantially finished shape. Accordingly, almost no distortion remains in the width direction of the workpiece. On the other hand, the distortion remains since the workpiece in the thickness direction is in a state before the machining is performed. Therefore, the workpiece in the width direction is clamped without clamping the workpiece in the thickness direction. In this manner, the workpiece can be processed without constraining the workpiece in the thickness direction in which the distortion remains. Accordingly, the processing distortion can be minimized as much as possible by releasing the distortion in the thickness direction. The external shape of the workpiece in the width direction is the substantially finished shape. This means that the workpiece has the finished shape which does not need additional machining, and does not exclude slight processing such as surface finishing.

Furthermore, in the processing device according to the aspect of the present invention, the clamping fixture may include a position adjustment mechanism that prevents a position of the workpiece from being changed in a plane along the width direction before and after the workpiece is clamped.

The clamping fixture includes the position adjustment mechanism that prevents the position of the workpiece from being changed in the plane (in the xy-plane in which the thickness direction is defined as a z-direction) along the width direction before and after the workpiece is clamped. In this manner, when the workpiece is clamped, the workpiece is not clamped in a deformed state in the xy-plane along the width direction. Accordingly, the distortion in the xy-plane can be released. The position adjustment mechanism includes a mechanism that fixes a workpiece fixing portion again to a base after causing the workpiece to float by using magnetism after the workpiece is clamped, a mechanism that measures a displacement amount of the workpiece when the workpiece is clamped, and that causes the position of the workpiece to recover the displacement amount after the workpiece is clamped, and a mechanism that clamps the workpiece after the workpiece is fixed in a clamping direction.

Furthermore, the processing device according to the aspect of the present invention may further include a roughing tool for processing the workpiece at a roughing position, a finishing tool for processing the workpiece at a finishing position, and a control unit for operating the position adjustment mechanism between the processing performed by the roughing tool and the processing performed by the finishing tool.

The roughing requires a larger processing amount than that of the finishing. Accordingly, if the roughing is performed, remaining distortion of the workpiece is removed. Therefore, after the roughing is performed, the position adjustment mechanism is operated so as to release the distortion in the xy-plane. In this manner, accuracy in the finishing is improved.

According to another aspect of the present invention, there is provided a processing method including a clamping step of clamping a workpiece in a width direction without clamping the workpiece in a thickness direction, the workpiece having a substantially finished external shape in the width direction, and a processing step of machining the workpiece in the thickness direction.

The processing method according to the aspect of the present invention may further include a position adjustment step of preventing a position of the workpiece from being changed in a plane along the width direction before and after the workpiece is clamped.

The processing method according to the aspect of the present invention may further include a roughing step of processing the workpiece at a roughing position, and a finishing step of processing the workpiece at a finishing position. The position adjustment step may be performed between the roughing step and the finishing step.

Advantageous Effects of Invention

It is possible to minimize the processing distortion as much as possible.

DESCRIPTION OF EMBODIMENTS

Hereinafter, an embodiment of a processing device and a processing method will be described. In the present embodiment, an easily deformable workpiece such as a large component of an aircraft is machined. The workpiece is made of metal such as an aluminum alloy, and is processed into a shape of an aircraft structure frame. For example, the workpiece has an elongated shape whose length is several meters (4 to 5 m), is subjected to pocket processing in various ways so that a thickness of the processed plate is several millimeters (1 to 2 mm).

Figure 1A:
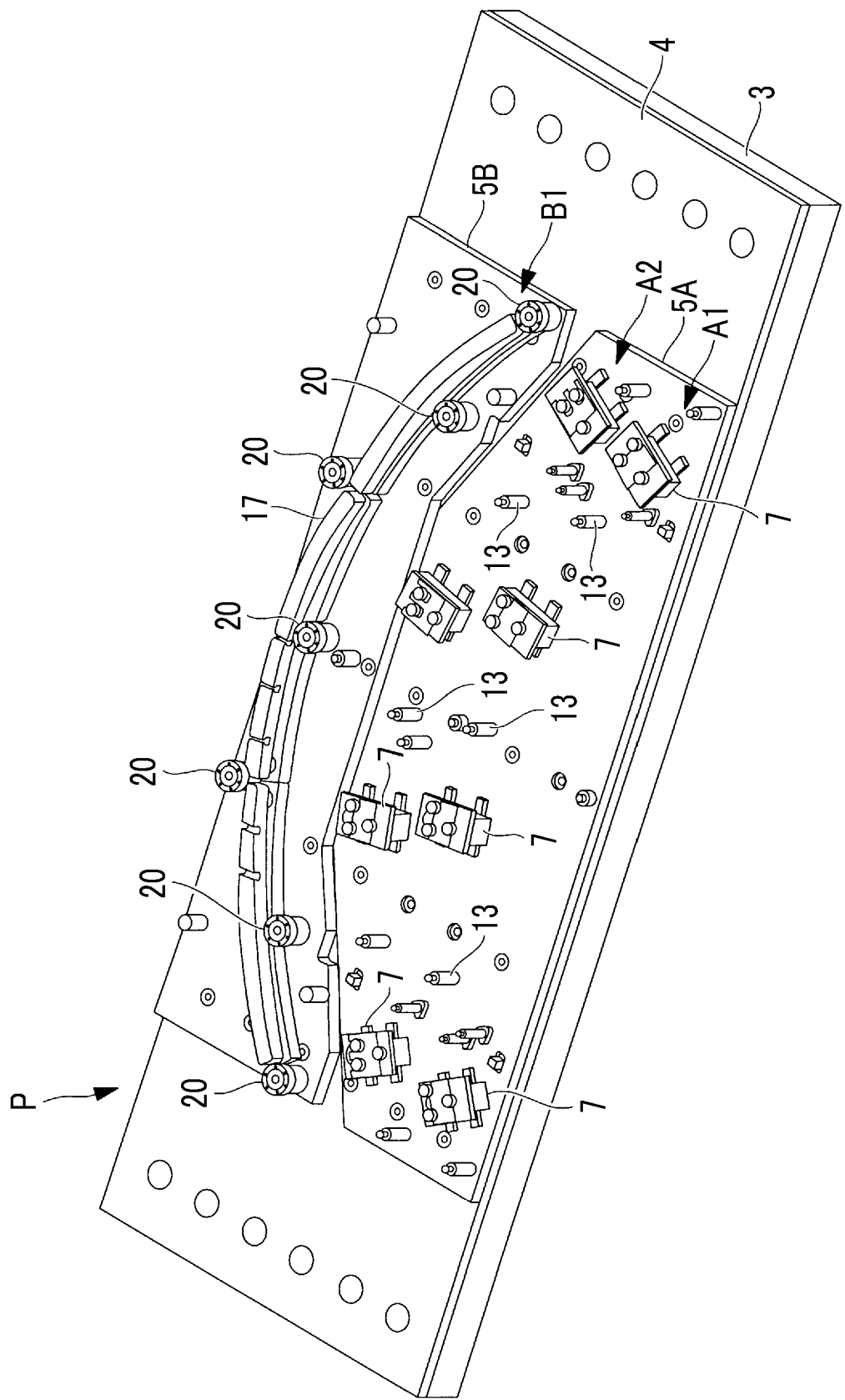
FIG. 1A is a perspective view illustrating a palette.

FIG. 1A illustrates a palette P used in the processing device for processing a workpiece W. The palette P includes a table 3, a sub-base 4 fixed onto the table 3, and a first jig base 5A and a second jig base 5B which are fixed onto the sub-base 4.

Figure 1B:
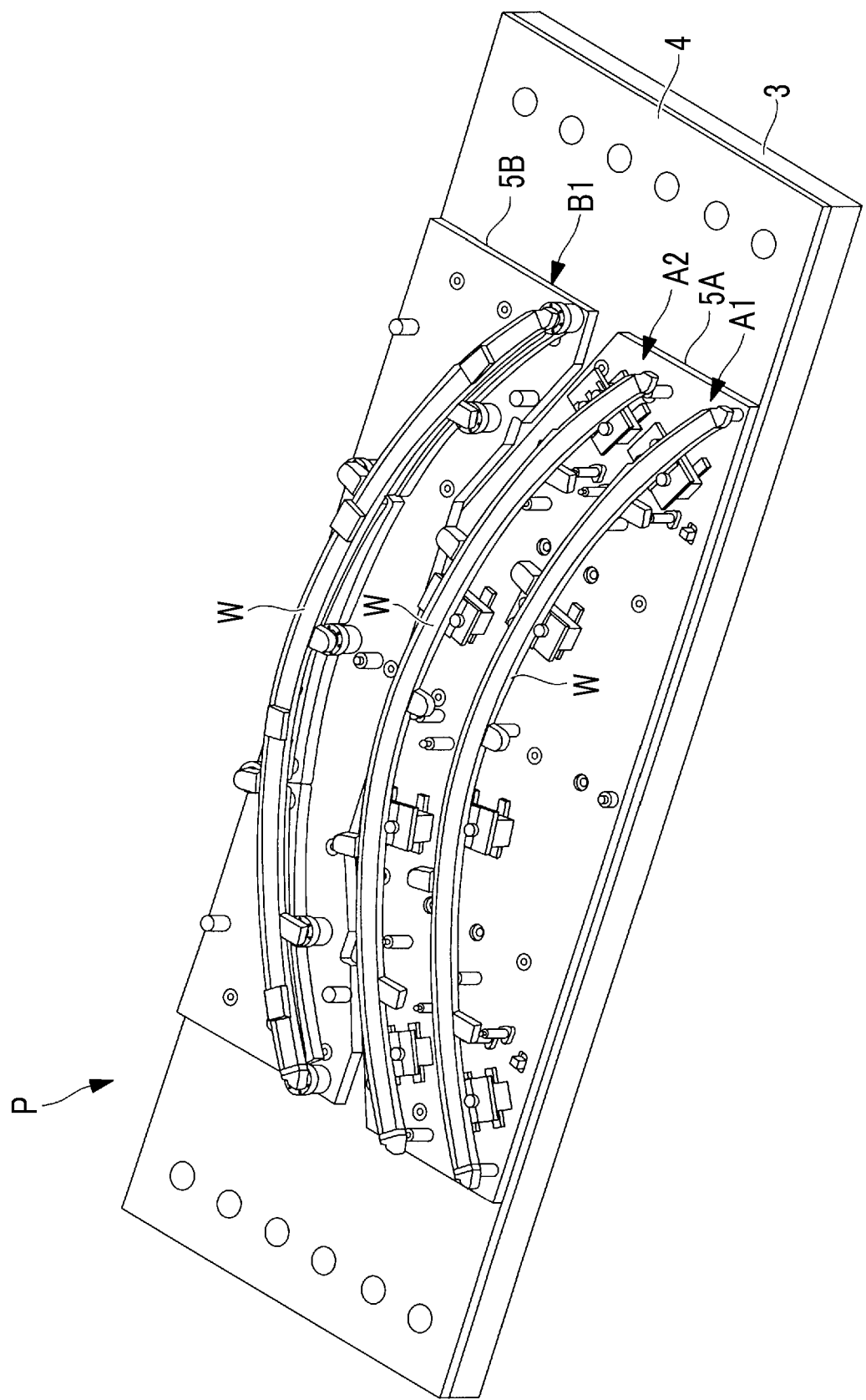
FIG. 1B is a perspective view illustrating a state where a workpiece is installed in the palette in FIG. 1A.

The first jig base 5A is provided with a first processing position A1 for roughing a front surface of the workpiece W, and a second processing position A2 for roughing and finishing a rear surface of the workpiece W. As illustrated in FIG. 1B, the workpiece W is installed at each of the first processing position A1 and the second processing position A2.

The respective processing positions A1 and A2 have a plurality of flexible vices (clamping fixtures) 7 for clamping the workpiece W from the outside in the width direction. An interval between the flexible vices 7 is 800 mm or longer, for example. One of the plurality of flexible vices 7 is selected as a reference position. The workpiece W is clamped by the flexible vice 7 located at the reference position. Thereafter, the workpiece W is clamped sequentially by the adjacent flexible vice 7.

Figure 2:
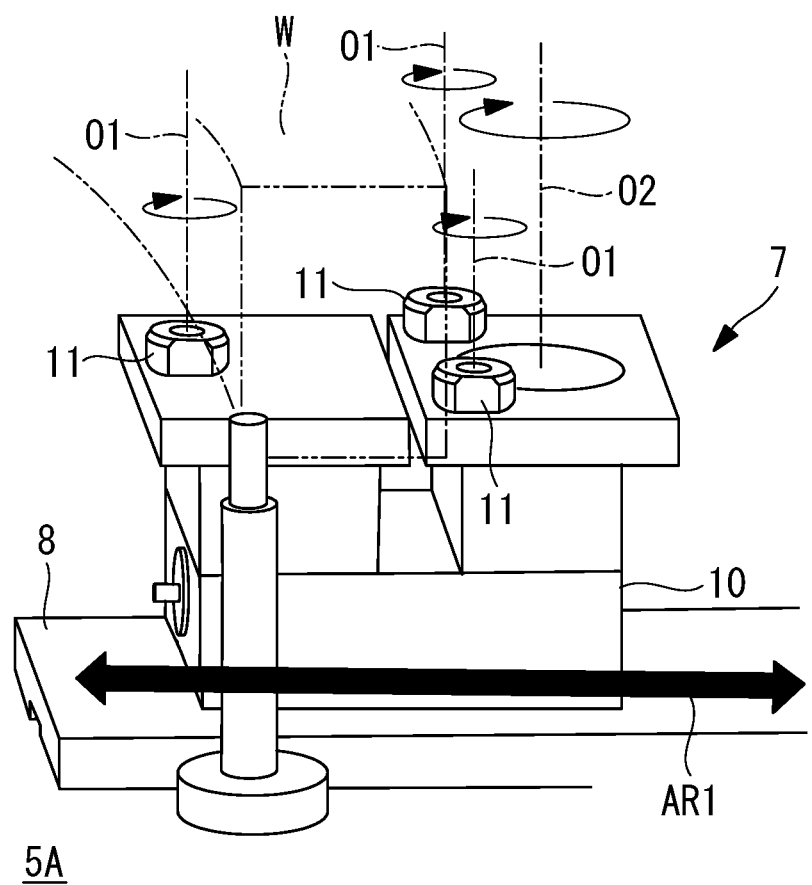
FIG. 2 is a perspective view illustrating a flexible vice.

FIG. 2 illustrates the flexible vice 7. In the flexible vice 7, a base 10 can slide on a rail 8 in a direction of an arrow AR1 which is the width direction of the workpiece W. The flexible vice 7 is fixed in a sliding direction by a slide base 9. Three jaws 11 respectively rotatable around a vertical axis O1 are disposed on an upper surface of the flexible vice 7, that is, on the base 10. The jaw 11 has a cylindrical shape, and an outer cylindrical surface thereof comes into contact with the workpiece W so as to clamp the workpiece W. In addition, the whole flexible vice 7 is rotatable around a vertical axis O2, and the workpiece W can be clamped in accordance with a shape of the workpiece W. Then, the respective jaws 11 clamp the workpiece W in the xy-plane (extending direction of the first jig base 5A), and do not clamp the workpiece W in a z-direction (that is, the thickness direction of the workpiece W). Therefore, even in a case where the workpiece W floats on an installation surface after being deformed in the thickness direction, the workpiece W is clamped without any change.

The flexible vice 7 has a position adjustment mechanism that can adjust a position in a direction of the xy-plane with respect to the first jig base 5A. Specifically, the base 10 is configured to be capable of floating with respect to the rail 8 fixed to the first jig base 5A. As a floating method, a method using magnetism or air is used. The control unit controls the base 10 to float. After the workpiece W is clamped by each of the jaws 11, the base 10 is caused to float. In this manner, the position in the xy-plane is controlled so as to recover the position of the workpiece W installed before the workpiece W is clamped.

The roughing is completely performed on the surface of the workpiece W at the first processing position A1. Accordingly, at the second processing position A2, it is possible to adopt an internal clamp that clamps the workpiece W by applying a load outward from the inside of the pocket portion of the workpiece W.

As illustrated in FIG. 1A, a plurality of jacks 13 protruding upward from the first jig base 5A are disposed between the flexible vices 7. The jack 13 has a cylindrical shape whose height is adjustable. The workpiece W is point-supported from below at a top portion of the jack 13.

The second jig base 5B has a third processing position B1 at which final finishing is performed on the front surface of the workpiece W. As illustrated in FIG. 1B, the workpiece W is installed at the third processing position B1.

A detail (support block) 17 is fixed to the third processing position B1. The detail 17 has an elongated shape similar to the workpiece W, and the front surface has a shape corresponding to a finished shape of the rear surface (facing surface) of the workpiece W. In this manner, the rear surface of the workpiece W comes into contact with the front surface of the detail 17 with substantially no gap.

Quick clamping devices (pin fixtures) 20 are disposed on the second jig base 5B at a predetermined interval on both sides of the detail 17. The quick clamping device 20 is a unit that clamps a pin, and includes a pin fixing member that accommodates a tip of the pin fixed to the workpiece W and causes the jaws to grip and fix an outer periphery of the pin tip. The quick clamping devices 20 are operated using pneumatic pressure. The quick clamping devices 20 are installed at an interval of 500 mm or longer, for example.

The quick clamping device 20 detachably fixes the fixed pin to a tab disposed in the workpiece W. The pin is attached after the finishing is completely performed on the rear surface of the workpiece W at the second processing position A2. Specifically, the tab is subjected to tapping, and a screwed pin is screwed and fixed thereto. The tab is removed after the final finishing is completely performed on the workpiece W.

The processing device includes a control unit that controls various operations. For example, the control unit is configured to include a central processing unit (CPU), a random access memory (RAM), a read only memory (ROM), and a computer-readable storage medium. Then, as an example, a series of processes for realizing various functions is stored in the storage medium in a form of a program. The CPU causes the RAM to read the program, and executes information processing/arithmetic processing, thereby realizing various functions. The program may adopt a form in which the program is installed in advance in the ROM or other storage media, a form in which the program is provided in a stored state in the computer-readable storage medium, or a form in which the program is distributed via wired or wireless communication means. The computer-readable storage medium includes a magnetic disk, a magneto-optical disk, a CD-ROM, a DVD-ROM, and a semiconductor memory.

Figure 3:
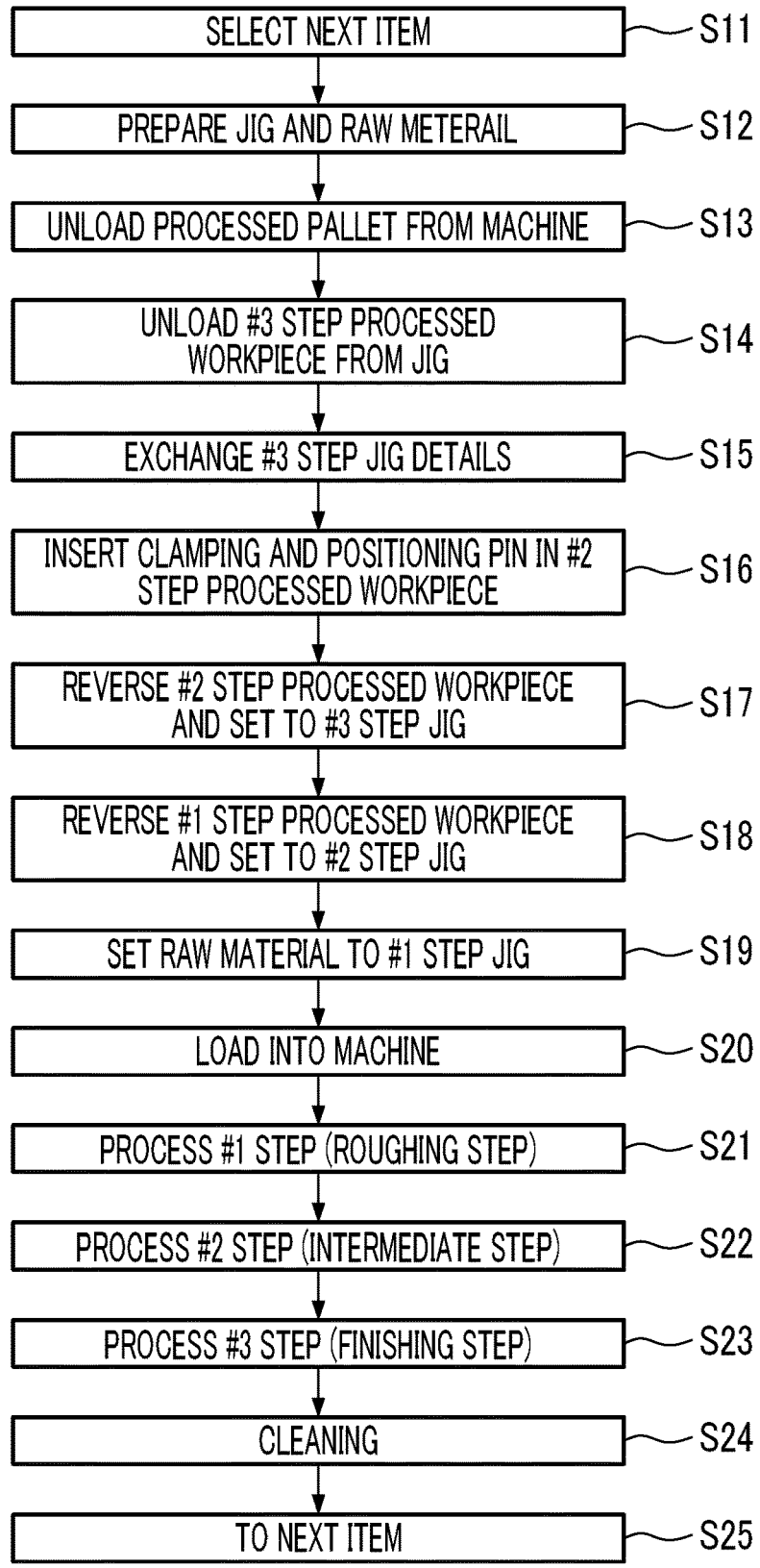
FIG. 3 is a flowchart illustrating a processing step.

Next, the processing method using the above-described processing device will be described with reference to FIG. 3. The following steps are performed in accordance with commands of the control unit.

First, items to be subsequently processed are selected in Step S11, and a jig base and a raw material (unprocessed workpiece W) are prepared (Step S12). Then, the palette P completely processed using a processing machine is unloaded (Step S13), and the workpiece W completely processed at the third processing position B1 is unloaded (Step S14). Then, the second jig base 5B and the detail 17 at the third processing position B1 are exchanged (Step S15). In Step S16, the finishing is performed on the rear surface of the workpiece W at the second processing position A2. Thereafter, the pin is inserted into a hole drilled in the tab. Next, the front surface and the rear surface of the workpiece W are reversed at the second processing position A2 by a transfer robot, and the workpiece W is set at the third processing position B1 (Step S17). In Step S18, the workpiece W for which the roughing is completely performed on the front surface of the workpiece W at the first processing position A1 is reversed by the transfer robot, and the workpiece W is set at the second processing position A2.

In Step S19, the raw material which is the workpiece W before the roughing is set at the first processing position A1 by the transfer robot. As described above, the workpieces W are set at the respective processing positions A1, A2, and B1. Thereafter, the palette P is loaded into the machine at the same time (Step S20). The roughing is performed on the front surface of the workpiece W at the first processing position A1 by using a roughing tool such as an end mill (Step S21). The roughing is performed on the rear surface of the workpiece W at the second processing position A2, and the finishing (indicated as an "intermediate step" in the drawing) is performed using a finishing tool such as the end mill (Step S22). The final finishing is performed on the front surface of the workpiece W by using a final finishing tool such as the end mill at the third processing position B1 (Step S23).

Then, an interior of the machine is cleaned using an air blow (Step S24), and the next item is prepared (Step S25).

The above-described steps are repeatedly performed. In this manner, the processing can be efficiently performed using the processing positions A1, A2, and B1.

Figure 4:
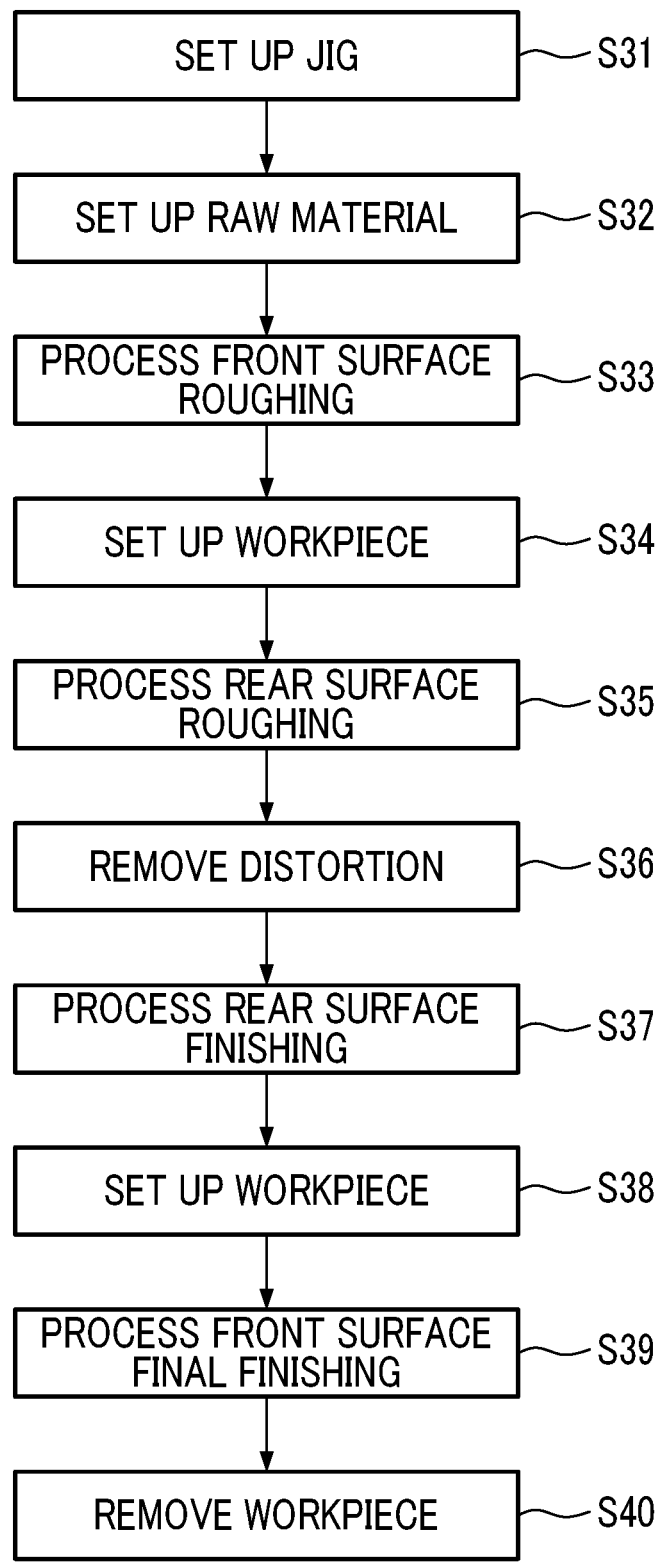
FIG. 4 is a flowchart illustrating a processing method of the workpiece.

Next, the processing method of the workpiece W in the respective steps described with reference to FIG. 3 will be described with reference to FIG. 4. Unlike FIG. 3, in FIG. 4, description will be made in the order of the processing at the first processing position A1, the processing at the second processing position A2, and the processing at the third processing position B1.

In Step S31, the jig is set up before the processing is performed at the first processing position A1. Specifically, the first jig base 5A and the flexible vice 7 are installed.

Then, the workpiece W attached to the first processing position A1 (Step S32). Specifically, in a state where the respective jaws 11 and the slide base 9 of the flexible vice 7 are loosened, the workpiece W is installed on the base 10, and the jaws 11 are fixed by being brought into contact with the side surface of the workpiece W. Then, the base 10 is caused to float from the rail 8 by the position adjustment mechanism. Thereafter, the position of the base 10 is aligned with the rail 8, and the rail 8 is fixed by the slide base 9. In this way, the workpiece W is fixed in the xy-plane without adding the distortion, and is also fixed in the z-direction (thickness direction of the workpiece W) without adding the distortion.

Next, in Step S33, the roughing is performed on the front surface of the workpiece W. The roughing removes a portion of the distortion remaining on the workpiece W.

Next, in Step S34, the workpiece W is set up. Specifically, the flexible vice 7 is loosened so as to remove the workpiece W from the first processing position A1, and the workpiece W is installed at the second processing position A2. Similarly to Step S32, the workpiece W is fixed without adding the distortion not only in the xy-plane but also in the z-direction by using the position adjustment mechanism of the flexible vice 7.

Then, in Step S35, the roughing is performed on the rear surface of the workpiece W. Thereafter, in Step S36, the distortion is removed. Specifically, the respective jaws 11 and the slide base 9 of the flexible vice 7 are loosened at the second processing position A2. Thereafter, the jaws 11 are fixed again by being brought into contact with the side surface of the workpiece W. Then, the base 10 is caused to float from the rail 8 by the position adjustment mechanism. Thereafter, the position of the base 10 is aligned with the rail 8, and the rail 8 is fixed by the slide base 9. In this way, the workpiece W is fixed in the xy-plane without adding the distortion, and is also fixed in the z-direction without adding the distortion. In this manner, the distortion remaining in the workpiece W is released.

Then, in Step S37, the finishing is performed on the rear surface of the workpiece W. Thereafter, in Step S38, the workpiece W is set up. Specifically, the flexible vice 7 is loosened so as to remove the workpiece W from the second processing position A2, and the workpiece W is installed at the third processing position B1. The workpiece W is fixed by fixing the pin fixed to the tab disposed in the workpiece W to the quick clamping device 20.

Then, in Step S39, the final finishing is performed on the front surface of the workpiece W, and the workpiece W is removed (Step S40).

According to the present embodiment, the following operational effects are achieved. Before the roughing (Step S33) is performed on the front surface of the workpiece W, the external shape of the workpiece W in the width direction is a substantially finished shape. Accordingly, almost no distortion remains in the width direction of the workpiece W. On the other hand, the distortion remains since the workpiece W in the thickness direction (z-direction) is in a state before the machining is performed. Therefore, the workpiece W in the width direction is clamped without clamping the workpiece W in the thickness direction. In this manner, the workpiece can be processed without constraining the workpiece in the thickness direction in which the distortion remains. Accordingly, the processing distortion can be minimized as much as possible by releasing the distortion in the thickness direction.

The flexible vice 7 includes the position adjustment mechanism that prevents the position of the workpiece W from being changed in the xy-plane along the width direction before and after the workpiece W is clamped. In this manner, when the workpiece W is clamped, the workpiece W is not clamped in a deformed state in the xy-plane. Accordingly, the distortion in the xy-plane can be released.

The roughing requires a larger processing amount than that of the finishing. Accordingly, if the roughing is performed, remaining distortion of the workpiece W is removed. Therefore, after the roughing is performed, the position adjustment mechanism is operated so as to release the distortion in the xy-plane (Step S36). In this manner, accuracy in the finishing can be improved.

The present embodiment adopts the position adjustment mechanism that uses the flexible vice 7 as the workpiece fixture for clamping the workpiece W so that the flexible vice 7 floats by using magnetism or pneumatic pressure. However, the present invention is not limited thereto.

Figure 5:
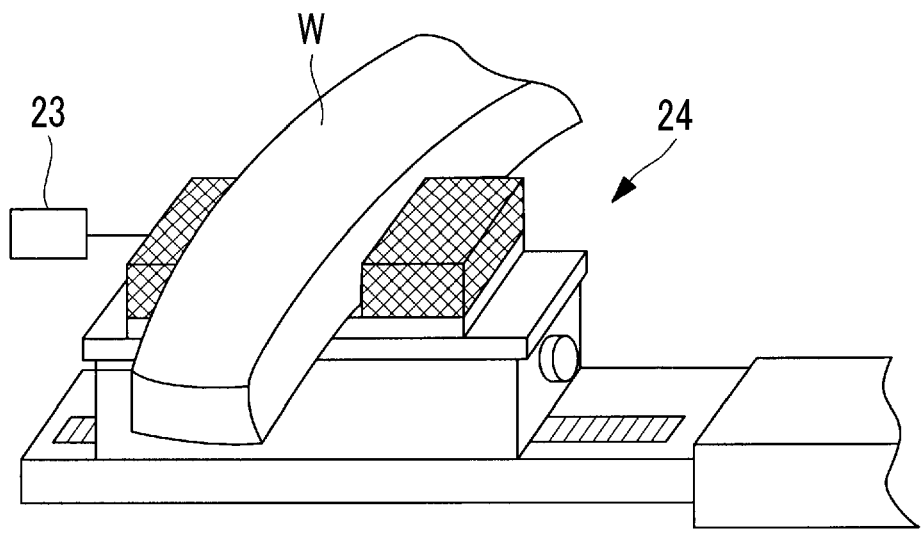
FIG. 5 is a perspective view illustrating a modification example of a clamping fixture.

For example, as illustrated in FIG. 5, a mechanism may be adopted as follows. A displacement sensor 23 for measuring the displacement amount of the workpiece W in the xy-plane is used when the workpiece W is clamped. In this manner, the mechanism causes the position of the workpiece W to recover the displacement amount in accordance with a command of the control unit after the workpiece W is fixed using a clamping fixture 24.

Figure 6:
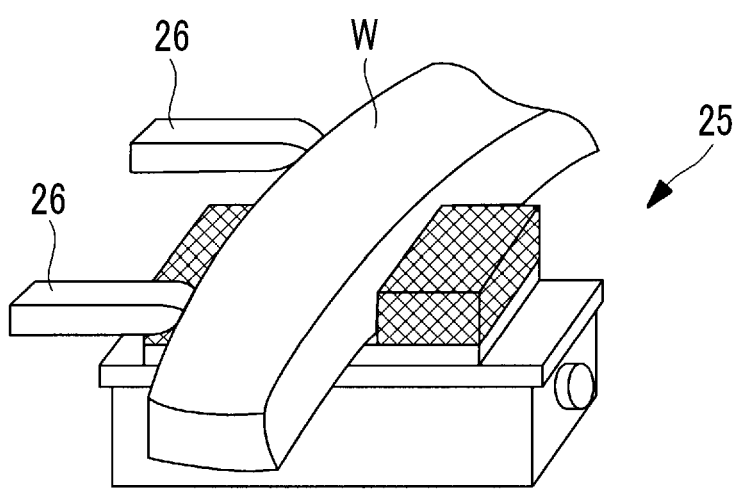
FIG. 6 is a perspective view illustrating a modification example of the clamping fixture.

Alternatively, as illustrated in FIG. 6, a mechanism may be adopted as follows. The workpiece W is fixed to a workpiece support 26 in a clamping direction of the clamping fixture 25 so that the workpiece W is not displaced. Thereafter, the workpiece W is clamped using the clamping fixture 25.

REFERENCE SIGNS LIST

3: table
4: sub-base
5A: first jig base
5B: second jig base
7: flexible vice (clamping fixture)
8: rail
9: slide base
10: base
11: jaw
13: jack
17: detail (support block)
20: quick clamping device (clamping and positioning pin device)
23: displacement sensor
24, 25: clamping fixture
28: a mechanism for recovering the position of the workpiece
A1: first processing position
A2: second processing position
B1: third processing position
P: palette
W: workpiece

The invention claimed is:

1. A processing device comprising:
   a tool for machining a workpiece in a thickness direction, the workpiece having a substantially finished external shape in a width direction; and
   a clamping fixture for directly clamping the workpiece in the width direction without clamping the workpiece in the thickness direction,
   wherein the clamping fixture includes a position adjuster that releases distortion of the workpiece in a plane along the width direction when the workpiece is clamped, and
   wherein, after the workpiece is clamped, the position adjuster causes the clamping fixture to float so as to recover a position of the workpiece installed before the workpiece is clamped.

2. The processing device according to claim 1, further comprising:
   the tool including a roughing tool for processing the workpiece at a roughing position;
   the tool including a finishing tool for processing the workpiece at a finishing position; and
   a control unit for operating the position adjuster between the processing performed by the roughing tool and the processing performed by the finishing tool.

3. A processing method comprising:
   a clamping step of directly clamping a workpiece in a width direction without clamping the workpiece in a thickness direction, the workpiece having a substantially finished external shape in the width direction;
   a processing step of machining the workpiece in the thickness direction; and
   a position adjustment step of releasing distortion of the workpiece by using a clamping fixture in a plane along the width direction when the workpiece is clamped, wherein the clamping fixture includes a position adjuster that releases distortion of the workpiece in a plane along the width direction when the workpiece is clamped,
   wherein, after the workpiece is clamped in the position adjustment step, the clamping fixture is caused to float so as to recover a position of the workpiece installed before the workpiece is clamped.

4. The processing method according to claim 3, further comprising:
   a roughing step of processing the workpiece at a roughing position; and
   a finishing step of processing the workpiece at a finishing position;
   wherein the position adjustment step is performed between the roughing step and the finishing step.

* * * * *